United States Patent [19]
Fiore

[11] Patent Number: 5,560,644
[45] Date of Patent: Oct. 1, 1996

[54] RETAINER FRAME FOR AIR BAG ASSEMBLY

[75] Inventor: Francis M. Fiore, Bruce Township, Mich.

[73] Assignee: TRW Vehicle Safety Systems Inc., Lyndhurst, Ohio

[21] Appl. No.: 496,078

[22] Filed: Jun. 28, 1995

[51] Int. Cl.⁶ .................................................. B60R 21/16
[52] U.S. Cl. .................................. 280/728.2; 280/732
[58] Field of Search .................................. 280/728.2, 732

[56] References Cited

U.S. PATENT DOCUMENTS

| | | | |
|---|---|---|---|
| 4,842,300 | 6/1989 | Ziomek et al. | 280/732 |
| 5,195,775 | 3/1993 | Komerska et al. | 280/732 |
| 5,255,937 | 10/1993 | Emambakhsh et al. | 280/732 |
| 5,261,692 | 11/1993 | Kneip et al. | 280/728.2 |
| 5,263,738 | 11/1993 | Oda et al. | 280/728.2 |
| 5,310,213 | 5/1994 | Mori | 280/728.2 |
| 5,335,936 | 8/1994 | Faigle et al. | 280/728.2 |
| 5,356,174 | 10/1994 | Rhein et al. | 280/728.2 |

*Primary Examiner*—Kenneth R. Rice
*Attorney, Agent, or Firm*—Tarolli, Sundheim, Covell, Tummino & Szabo

[57] ABSTRACT

An apparatus (20) comprises an inflatable air bag (26) having an inlet opening (112) and a mounting portion (106) adjacent the inlet opening. A reaction canister (42) supports an inflator (24) for inflating the air bag (26). A retainer frame (104) attaches the mounting portion (106) of the air bag (26) to the reaction canister (42). The retainer frame (104) includes a plurality of frame portions (144, 146) connected together. At least one of the frame portions (144) resists outward deflection in one direction during inflation of the air bag. The one frame portion (144) has a plurality of slots (222) to permit the frame portion to deflect with a deflection component directed opposite the one direction when a force, external to the apparatus, is applied.

29 Claims, 4 Drawing Sheets

RETAINER FRAME FOR AIR BAG ASSEMBLY

BACKGROUND OF THE INVENTION

Technical Field

The present invention relates to an inflatable vehicle occupant restraint system, and particularly to a vehicle air bag assembly having a retainer frame for mounting an inflatable air bag to a reaction canister.

Description of the Prior Art

A vehicle air bag assembly typically includes a folded air bag and an inflator which are supported in a container. When the vehicle is involved in a collision requiring inflation of the air bag, the inflator provides an inflation fluid to inflate the air bag.

A known container construction for a passenger side air bag assembly includes a reaction canister. During inflation of the air bag, the reaction canister is subjected to substantial internal pressure. Under such pressure, walls forming an opening of the reaction canister tend to deflect outward or "fish-mouth" during inflation of the air bag.

One structure for resisting fish-mouthing of the walls of an air bag reaction canister is disclosed in U.S. Pat. No. 5,195,775. U.S. Pat. No. 5,195,775 discloses an air bag retainer frame comprising solid frame members, having rectangular cross-sections, for attaching an air bag to a reaction canister. The retainer frame adds strength to the reaction canister to resist fish-mouthing. U.S. Pat. No. 5,255,937 discloses another retainer frame with tubular frame members to help resist fish-mouthing of a reaction canister.

Fish-mouthing of a reaction canister can be minimized by increasing the strength of the air bag retainer frame. However, it is desirable for a reaction canister to have walls that deflect in response to an applied force, such as a force due to a vehicle occupant contacting the instrument panel or the like. The stronger the retainer frame, the less likely the walls of the reaction canister will deflect due to the occupant contacting the instrument panel or the like.

SUMMARY OF THE INVENTION

The present invention is directed to an apparatus for protecting a vehicle occupant during an emergency situation, such as a vehicle collision. The apparatus is an air bag assembly comprising a reaction canister and an air bag retainer frame to secure an inflatable air bag to the reaction canister. The retainer frame resists fish-mouthing of the reaction canister during inflation of the air bag. The retainer frame is constructed to permit the reaction canister to deflect inward readily with a deflection component directed opposite to the fish-mouthing direction when a force, external to the air bag assembly, is applied to the reaction canister.

The apparatus of the present invention is attachable to a vehicle and comprises an inflatable air bag having a mounting portion defining an inlet opening. An inflator provides a source of inflation fluid for inflating the air bag through the inlet opening. A reaction canister supports the air bag and the inflator. A retainer frame attaches the mounting portion of the air bag to the reaction canister. The retainer frame has frame portions connected together. At least one of the frame portions resists widening of the inlet opening by outward deflection in one direction (fish-mouthing) of the reaction canister during inflation of the air bag. Slots are formed partially through the one frame portion to permit inward deflection of a wall of the reaction canister and the one frame portion when a force external to the apparatus is applied to the reaction canister near the one frame portion. Such a force may be applied by a vehicle occupant to an instrument panel, for example, and transmitted to the reaction canister. The inward deflection has a deflection direction component extending in a direction opposite to the one (fish-mouthing) direction.

The retainer frame is mounted inside of the reaction canister. The slots define a plurality of frame sections with axial end surfaces spaced apart a predetermined distance. The axial end surfaces of adjacent frame sections engage to resist outward deflection of the reaction canister and the retainer frame during inflation of the air bag. Adjacent axial end surfaces open from the spaced apart predetermined distance to permit inward deflection of the reaction canister and retainer frame.

The one frame portion is a tubular member formed into a substantially D-shaped cross-section. The plurality of slots extend in a direction substantially parallel the flow of inflation fluid from the inflator into the air bag. The plurality of slots are spaced apart equal distances. Adjacent slots are spaced apart a distance in the range of about 0.2 inch to about 2 inches. The slots have a width measured in a direction transverse to the direction of the inflation fluid flow in the range of about 0.0001 inch to about 0.010 inch.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

Figure 1:
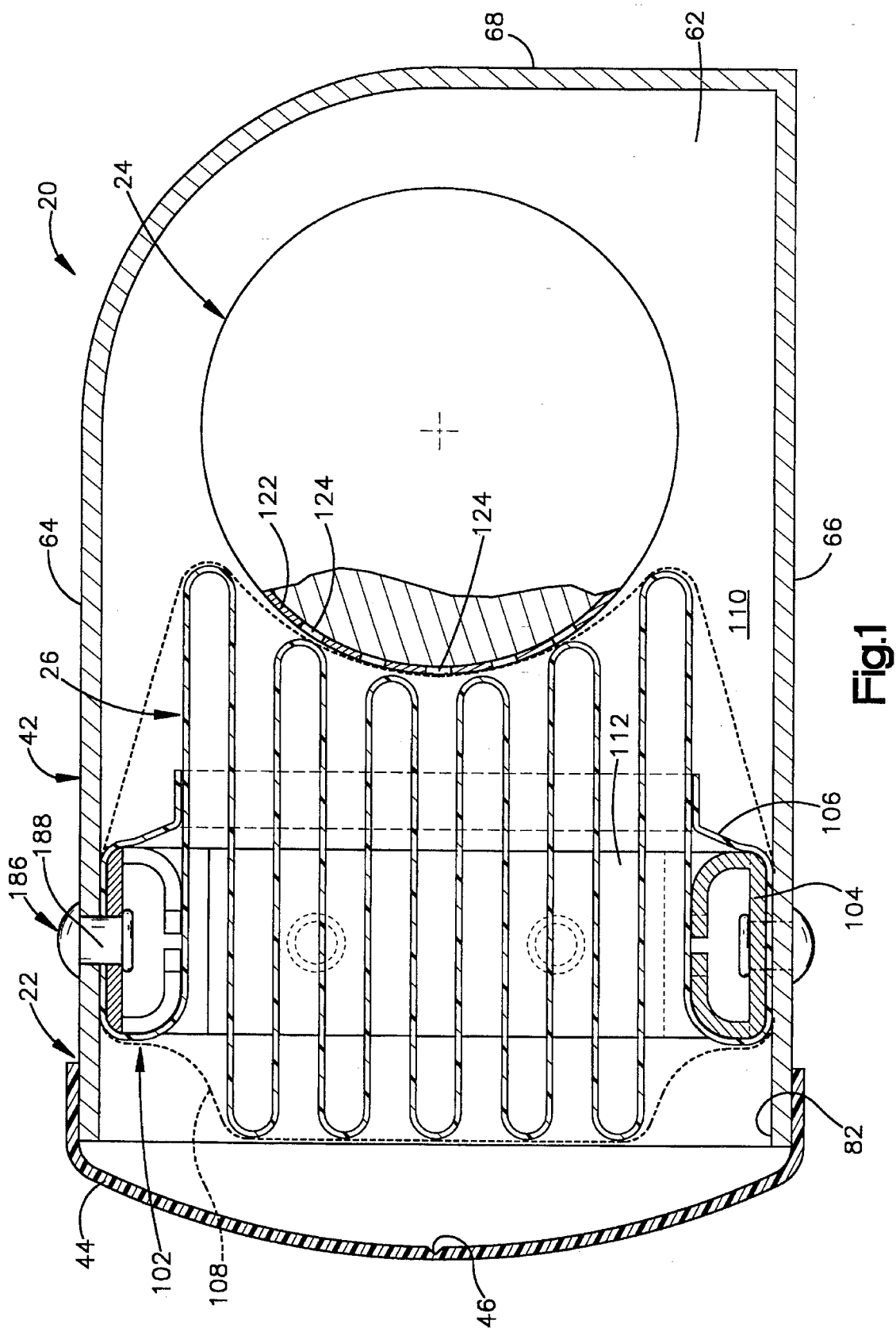
FIG. 1 is a schematic sectional view of a vehicle air bag assembly having a retainer frame embodying the present invention.

A vehicle passenger side air bag assembly 20 is illustrated in FIG. 1. The air bag assembly 20 includes a container 22 which houses and supports an inflator 24 and an air bag 26. The container 22 includes a reaction canister 42 and a cover 44 attached to the reaction canister. The inflator 24 provides a source of inflation fluid and is actuatable to discharge the inflation fluid to inflate the air bag 26. Upon inflation, the air bag 26 extends outwardly from the container 22 and into a passenger compartment of the vehicle.

The air bag assembly 20 is typically mounted in the vehicle in the instrument panel, dashboard or the like. The air bag assembly 20, as illustrated in FIG. 1, is mounted in the vehicle in a substantially "horizontal" orientation. It should be apparent that the air bag assembly 20 could be mounted in the vehicle in an orientation other than the horizontal orientation illustrated. The cover 44 has an outer surface with a profile matching the outer profile of the vehicle instrument panel or dashboard. The cover 44 has a weakened area, such as V-shaped groove 46 (FIG. 1), which during inflation of the air bag 26 ruptures to separate the cover into segments and allow the air bag to extend through the cover.

The reaction canister 42 includes a pair of spaced apart side walls 62 (only one of which is shown in FIG. 1), a top wall 64, a bottom wall 66, and a back wall 68. The side, top and bottom walls 62, 64, 66 of the reaction canister 42 define a substantially rectangular deployment opening 82 located opposite the back wall 68. The reaction canister 42 includes fastening structure (not shown) for mounting the air bag assembly 20 to a portion of the vehicle and for mounting the cover 44 to the reaction canister 42.

The air bag 26 is provided in an air bag package 102 that is easily handled and attached to the reaction canister 42. The air bag package 102 includes the air bag 26, a retainer frame 104 (FIG. 2), embodying the present invention and located in a mounting portion 106 of the air bag, and a wrapping 108. The air bag 26 is folded into a predetermined configuration substantially within the retainer frame 104 and is held in the folded condition by the wrapping 108.

The air bag 26 is made of a fabric, such as nylon, and is folded into the predetermined configuration. The predetermined configuration of the air bag 26 is shaped to fit conveniently into the opening 82 of the reaction canister 42 and to provide efficient deployment of the air bag from the container 22. The air bag 26 and the reaction canister 42 cooperate to define a substantially closed chamber 110 on which the inflation fluid from the inflator 25 can act.

The retainer frame 104 secures the mounting portion 106 of the air bag 26 to the walls 62, 64, 66 of the reaction canister 42 adjacent the opening 82. The retainer frame 104 defines a substantially rectangular inlet opening 112 at the mounting portion 106 of the air bag 26. The mounting portion 106 of the air bag 26 and the retainer frame 104 are placed in the reaction canister 42 inside of the opening 82 and fastened to the walls 62, 64, 66 of the reaction canister.

The retainer frame 104 comprises a relatively rigid metal structure. The retainer frame 104 is received in a continuous closed channel formed by the material of the mounting portion 106 of the air bag 26. The retainer frame 104 and the mounting portion 106 of the air bag 26 have an outer periphery which is slightly smaller than the opening 82 of the reaction canister 42. The retainer frame 104 and mounting portion 106 of the air bag 26 thus fit snugly inside the reaction canister and effectively seal the reaction canister 42 and define the chamber 110.

The inflator 24 has a generally cylindrical outer housing 122 through which a plurality of discharge openings 124 are formed. In a predetermined emergency situation requiring inflation of the air bag 26, the inflator 24 is actuated to provide the inflation fluid to inflate the air bag. The inflation fluid exits the housing 122 through the discharge openings 124 and is directed by the reaction canister 42 into the inlet opening 112 of the air bag 26 to inflate the air bag and expand the air bag out of the container 22.

Figure 6:
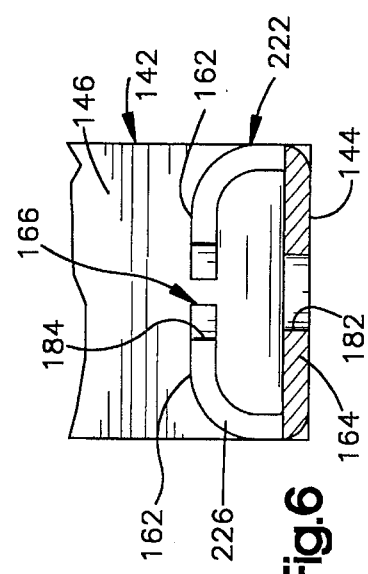
FIG. 6 is an enlarged sectional view of a portion of the retainer in FIG. 5.

The retainer frame 104 (FIGS. 2 and 3) includes a pair of frame components 142, each of which is substantially U-shaped. Each frame component 142 includes a tubular base portion 144 and a pair of leg portions 146. The leg portions 146 extend in a direction normal to the tubular base portion 144. Each tubular base portion 144 is formed by flanges 162 (FIG. 6) bent back over a central portion 164 to form a substantially D-shaped tube that is slightly open at a longitudinally extending central area 166.

The tubular base portions 144 of the retainer frame 104 are riveted to the walls 64, 66 of the reaction canister 42 to mount the air bag package 102 to the reaction canister. A plurality of holes 182 (FIGS. 2, 4, 5 and 6) are formed in the central portion 164 of each of the tubular base portions 144 for receiving a body 188 (FIG. 1) of a respective rivet 186. The bent flanges 162 define another plurality of holes 184, each of which is aligned with and slightly larger than a hole 182. A deformable grip portion of the rivet 186 may extend through holes 182 during attachment of the retainer frame 104 to the walls 64, 66 of the reaction canister 42.

The leg portions 146 of the frame components 142 have fastener openings 202. The fastener openings 202 are preferably circular and at predetermined locations to allow suitable fasteners to extend through and fix the frame components 142 together. It should be apparent that elongated openings could be formed in at least one of the leg portions 146 of each frame component 142 to allow for some adjustability in a direction parallel to the extent of the leg portions.

Figure 3:
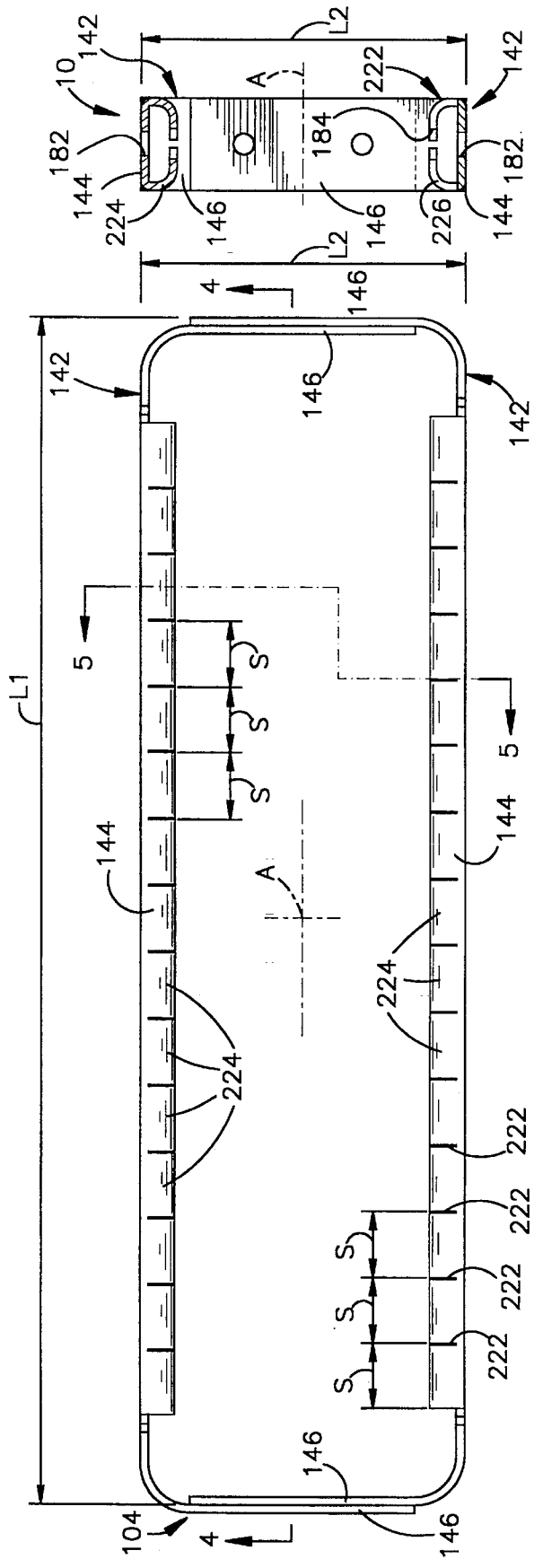
FIG. 3 is a front elevation view of the retainer frame of FIG. 2.
Figure 4:
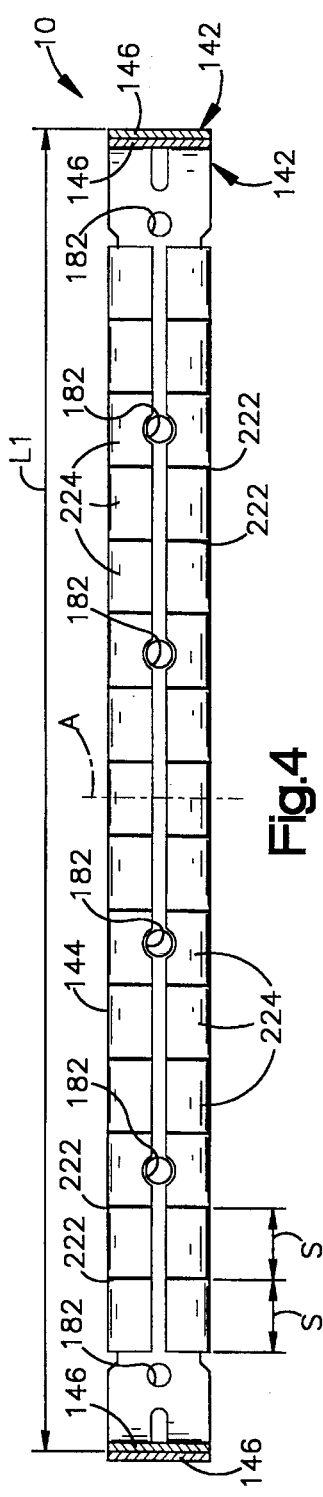
FIG. 4 is a sectional view of a portion of the retainer frame of FIG. 3, taken approximately along the line 4—4 in FIG. 3.
Figure 5:
FIG. 5 is a sectional view of a portion of the retainer of FIG. 3, taken approximately along the line 5—5 in FIG. 3.

When fixed together, the frame components 142 form the generally rectangular retainer frame 104, as illustrated in FIG. 3. The retainer frame 104 has a central axis A extending along the direction of flow of the inflation fluid during inflation of the air bag 26. The tubular base portions 144 extend parallel to one another and along opposite sides with a length L1. The leg portions 146 extend parallel to one another along opposite sides with a length L2. The length L1 of the tubular base portion 144 is at least twice, and preferably about three and one-half times, the length L2 of the leg portions 146.

The frame components 142 of the retainer frame 104 are made from a high carbon, heat treated steel alloy. The steel alloy has a relatively high strength. When the strength of the steel alloy is combined with the D-shaped tubular configuration of the base portions 146 of the frame components 142, the base portions of the retainer frame 104 resist outward deflection in one direction or fish-mouthing of the base portions and the walls 64, 66 of the reaction canister 42 during inflation of the air bag 26.

It is desirable for at least one of the tubular base portions 144 of the retainer frame 104 and a wall of the reaction canister 42, such as the upper wall 64, to be deflectable inwardly if the instrument panel in which the air bag assembly 20 is mounted is contacted forcefully by an occupant or a part of the occupant. Such contact will apply a force external to the air bag assembly 20 that is transmitted through and absorbed by the reaction canister 42 and the tubular base portion 144. The resultant inward deflection may not be a totally vertical deflection. The resultant inward deflection, however, will have a relatively large deflection vector component that extends in a direction substantially opposite the fish-mouthing direction.

Figure 2:
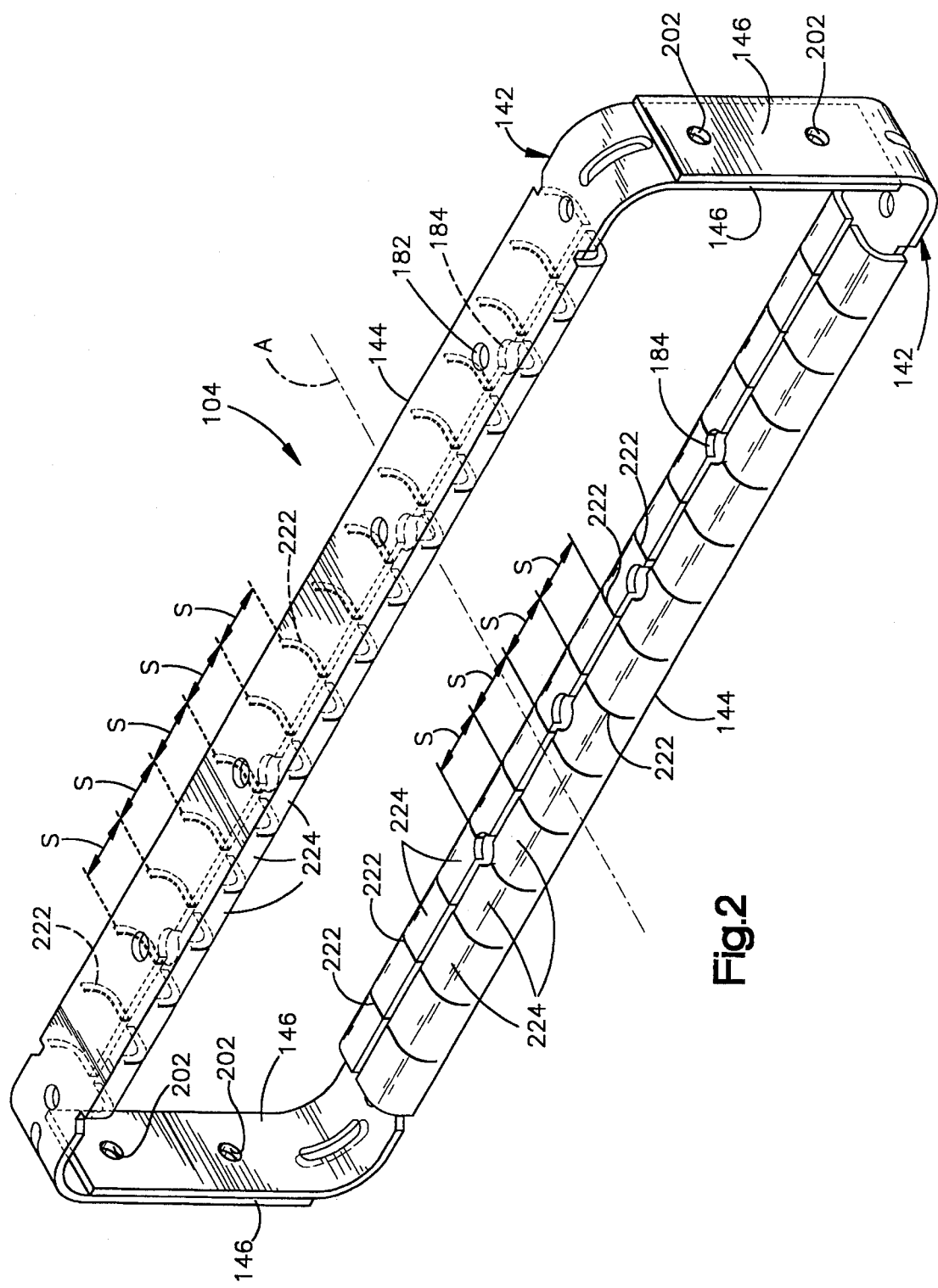
FIG. 2 is a perspective view of the retainer of Fig. 1.

The tubular base portions 144 of each of the frame components 142 of the present invention are readily deflectable inward, in comparison to unmodified retainer frames having tubular frame sections, as a result of a plurality of slots 222 formed in at least one of the tubular base portions. As shown in FIG. 2, the slots 222 extend completely through the flanges 162 of both tubular base portions 144 and are located on a side of each tubular base portion closest to the axis A, facing to the inside of the reaction canister 42. No part of the slots 222 is formed in the central portion 164 of the tubular base portion 144 so a substantially flat and rectangular cross-section central portion of the tubular base portions 144, as viewed in FIGS. 5 and 6, extends continuously around the inside of the reaction canister 42.

The slots 222 define a plurality of longitudinally adjacent and slightly spaced apart tube sections 224 of the tubular base portions 144. Each of the tube sections 224 is relatively rigid. Each of the slots 222 is relatively thin and extends in a direction substantially parallel to the axis A of the retainer frame 104. Axial end surfaces 226 (FIGS. 6–8) of adjacent tube sections 224 define a respective slot 222 between the adjacent tube members.

Each of the slots 222 is preferably formed by laser beam cutting. Each of the slots 222 has a width between the adjacent end surfaces 226 which is in the range of approximately 0.0001 inch to 0.010 inch (0.0025 mm to 0.25 mm) and preferably no greater than about 0.001 inch (0.025 mm). The adjacent slots 222 are spaced apart a substantially equal distance S in the range of approximately 0.2 inch to 2.0 inches (5 mm to 50 mm) and preferably approximately one inch (25 mm).

During inflation of the air bag 26, a force F1 (FIG. 7) applied from within the reaction canister 42 by the inflation fluid inflating the air bag also attempts to deflect the tubular base portions 144 outwardly in a direction away from the axis A of the retainer frame 104 and away from each other. This phenomena is referred to as "fish-mouthing". Fish-mouthing is resisted by the tubular base portions 144 when the adjacent end surfaces 226 of adjacent tube sections 224 defining the slots 222 engage one another.

Figure 7:
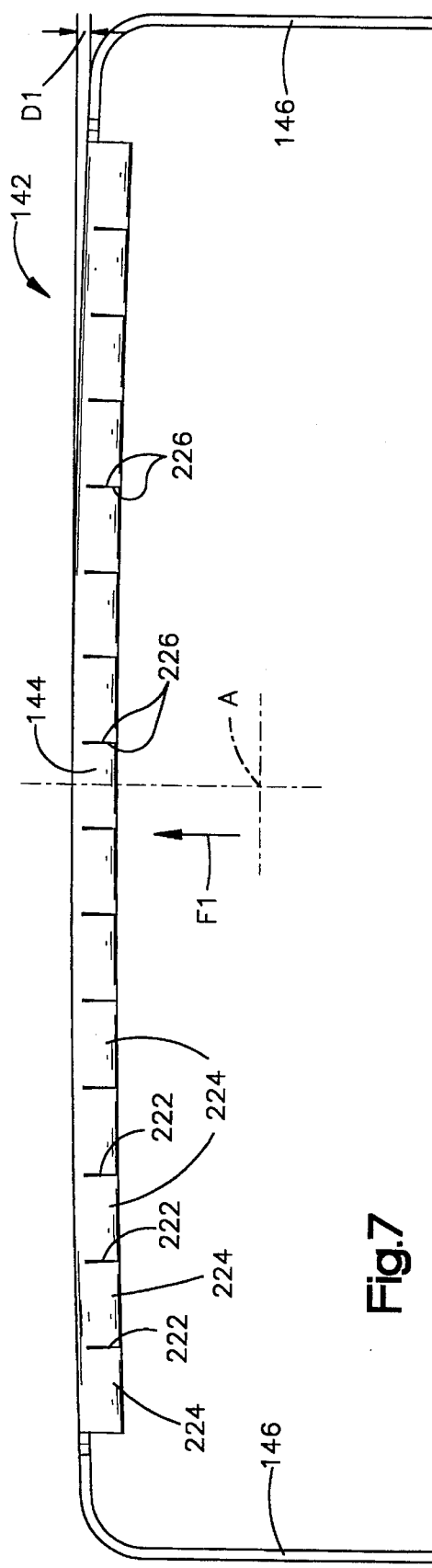
FIG. 7 is an enlarged view of a portion of the retainer frame of FIG. 3 illustrating resistance to fish-mouthing during inflation of an air bag.

Specifically, the end surfaces 226 defining the slots 222, which are initially spaced apart a predetermined distance, preferably no greater than approximately 0.001 inch, are brought into engagement by the force F1 of inflation fluid inflating the air bag 26, as illustrated in FIG. 7. End surfaces 226 of adjacent tube sections 224 engage to form a single relatively strong tube that deflects or bows slightly away from the axis A a first distance D1. For the tubular base portion 144 to deflect outwardly after the end surfaces 226 engage, the tube sections 224 must be compressed in a direction along the longitudinal axis of the tubular base portion. The resistance to fish-mouthing is thus controlled by the compressive strength of the tube sections 224 and the number, width and spacing S of the slots 222. The resistance to fish-mouthing can be varied by changing the material of the tube sections 224 and/or number, width and/or spacing of the slots 222.

When a force (FIG. 8) is applied to the reaction canister 42 from outside of the air bag assembly 20, the force will have a vector force component F2 applied in a direction opposite to the force F1 applied during inflation of the air bag 26. The upper tubular base portion 144 will attempt to reinforce the reaction canister 42 and resist deflection due to the vector force component F2 in a direction towards the axis A.

Figure 8:
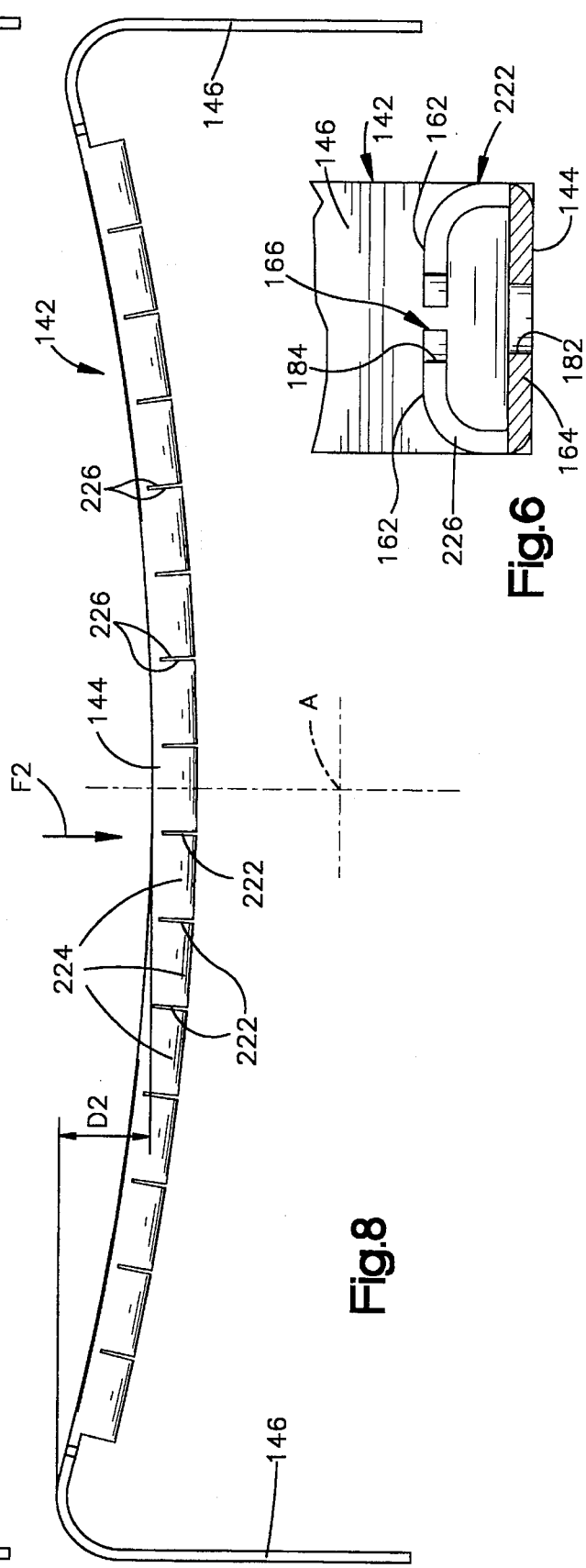
FIG. 8 is a view similar to FIG. 7 illustrating an inward deflection component during deflection of the portion of the retainer frame when a force external to the air bag assembly is applied.

The slots 222 will open slightly under the influence of the vector force component F2, as illustrated in FIG. 8. The opening of the slots 222 permit adjacent tube sections 224 to move relatively away from one another. The upper tubular base portion 144 deflects or bows inwardly in a direction towards the axis A of the retainer frame 104 a distance D2 sufficient to absorb the vector force component F2. When the force F1 and the vector force component F2 are of substantially equal magnitude, the construction of the retainer frame 104 permits a relatively larger inward deflection, as illustrated by the distance D2 in FIG. 8, when compared to the outward deflection, as illustrated by the distance D1 in FIG. 7. Thus, a relatively strong retainer frame 104 is provided which resists fish-mouthing but which is deflectable inwardly toward the axis A under the influence of a vector force component F2 external to the air bag assembly 20 applied in a direction opposite to the direction of the force F1 during inflation of the air bag 26.

Comparative testing and modeling was conducted for the air bag assembly 20 having the retainer frame 104 with the frame components 142 embodying the present invention. The results were compared to the results for an air bag assembly with an unmodified retainer frame having a D-shaped tubular base portion. The results were given as percentage change from the performance of an air bag assembly having a baseline retainer frame with a solid and rectangular cross-section.

For resistance to fish-mouthing, the air bag assembly with the unmodified retainer frame deflected outwardly 5.9% of the distance that the air bag assembly with the baseline retainer frame deflected when subjected to similar inflation pressure. The air bag assembly 20 with the retainer frame 104 deflected outwardly 7.6% of the distance that the air bag assembly with the baseline retainer frame deflected during inflation under similar inflation pressure. Thus, a very similar and improved resistance to fish-mouthing occurred in the air bag assembly 20 with the retainer frame 104 of the present invention and in the air bag assembly with the unmodified retainer frame.

The inward deflection of the tubular base portion 144 of the retainer frame 104 in response to a force applied external to the inflator assembly 20 resulted in a dramatic change when compared to the unmodified retainer frame. One simulated measure of the inward deflectability of a retainer frame, when exposed to an external force, is the amount of impact acceleration absorbed by the air bag assembly. A finite element analysis of a simulated head impact at the center of the tubular base portion 144 of the air bag assembly 20 having the retainer frame 104 of the present invention resulted in a 26% greater peak acceleration being absorbed than absorbed by the air bag assembly having the baseline retainer frame. An air bag assembly having the unmodified tubular base portion resulted in a 138% greater peak acceleration being absorbed than absorbed by the air bag assembly having the baseline retainer frame.

An additional simulated measure of inward deflectability of the retainer frame exposed to an external force, is a peak three millisecond clip acceleration absorbed by the air bag assembly. The peak three millisecond clip acceleration is the highest acceleration absorbed over a continuous three millisecond period of time. The retainer frame 104 of the present invention displayed similar comparative advantages when compared to the unmodified retainer frame. Specifically, a 10% increase in acceleration absorbed by the air bag assembly 20 having the retainer frame 104 resulted over the air bag assembly with the baseline retainer frame. The unmodified retainer frame resulted in a 144% increase in acceleration absorbed over the air bag assembly with the baseline retainer frame. Thus, a relatively large improvement in simulated external impact absorption results with the air bag assembly 20 having the retainer frame 104 of the present invention at a relatively insignificant sacrifice in resistance to fish-mouthing.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
    an inflatable air bag having a mounting portion;
    a reaction canister supporting said air bag;
    an inflator for providing a source of inflation fluid for inflating said air bag;
    a retainer frame for attaching said mounting portion of said air bag to said reaction canister, said retainer frame comprising a plurality of frame portions, at least one of said frame portions and a portion of said reaction canister being deflectable a first distance in one direction when a first force is applied thereto during inflation of said air bag; and
    means on said one frame portion for permitting a deflection of said one frame portion and said portion of said reaction canister a second distance in an opposite direction when a second force external to said apparatus is applied thereto, the first and second forces being of substantially equal magnitudes and the second distance being greater than the first distance.

2. The apparatus of claim 1 wherein said one direction of deflection is outward of said retainer frame and said opposite direction of deflection is inward of said retainer frame.

3. The apparatus of claim 1 wherein said one frame portion comprises a tubular member.

4. The apparatus of claim 3 wherein said means on said one frame portion for permitting deflection comprises a plurality of slots formed in said tubular member, each of said plurality of slots extending partially through said tubular member.

5. The apparatus of claim 4 wherein said retainer frame is located inside of said reaction canister and wherein each of said plurality of slots is formed on a side of said tubular member facing in a direction away from said reaction canister.

6. The apparatus of claim 5 wherein said tubular member has an open D-shape in a cross-section taken in a direction transverse to the longitudinal extent of said tubular member and includes a pair of flanges extending in opposite directions from a central portion, each of said plurality of slots extending only through said flanges.

7. The apparatus of claim 4 wherein said retainer frame has a central axis extending in a direction along the flow of inflation fluid into said air bag and wherein said plurality of slots are defined by planar surfaces extending in a direction substantially parallel to the axis of said retainer frame.

8. The apparatus in claim 4 wherein each of said slots has a width in the range of about 0.0001 inch to about 0.010 inch taken in a direction transverse to the direction of the flow of inflation fluid.

9. An apparatus comprising:
    an inflatable air bag having a mounting portion defining an inlet opening;
    an inflator providing a source of inflation fluid for inflating said air bag;
    a reaction canister supporting said inflator and said air bag and defining a deployment opening through which said air bag deploys;
    a retainer frame for attaching said mounting portion of said air bag to said reaction canister, said retainer frame having a tubular member to resist widening of the deployment opening during inflation of said air bag; and
    a plurality of slots extending partially through said tubular member in a direction transverse to the longitudinal extent of said tubular member to permit said tubular member to deflect inwardly when a force is applied to said reaction canister and said tubular member from outside of said apparatus.

10. The apparatus of claim 9 wherein each of said plurality of slots is spaced apart from an adjacent slot a substantially equal spacing.

11. The apparatus of claim 10 wherein adjacent slots are spaced apart a distance in the range of about 0.2 inch to about 2 inches.

12. The apparatus of claim 9 wherein each of said slots has a width in the range of about 0.0001 inch to about 0.010 inch.

13. The apparatus of claim 9 wherein said retainer frame defines a parallelogram having a pair of base portions and a pair of leg portions, said base portions having a length greater than a length of said leg portions and said plurality of slots being formed in one of said base portions.

14. The apparatus of claim 9 wherein said tubular member has an open D-shape in a cross-section taken in a direction transverse to the longitudinal extent of said tubular member.

15. The apparatus of claim 9 further including a wall defining said reaction canister and wherein said retainer frame is mounted to said wall inside of said reaction canister and each of said plurality of slots is located on a side of said tubular member facing in a direction away from said wall.

16. An apparatus comprising:
    an inflatable air bag having a mounting portion defining an inlet opening;
    a reaction canister supporting said air bag;
    an inflator for providing a source of inflation fluid for inflating said air bag;
    a retainer frame for attaching said mounting portion of said air bag to said reaction canister, said retainer frame comprising a plurality of frame portions connected together, at least one of said frame portions resisting outward deflection of said reaction canister in one direction during inflation of said air bag; and
    a plurality of slots extending at least partially through said one frame portion to permit an inward deflection of a portion of said reaction canister adjacent said one frame portion when a force external to said apparatus is applied to said reaction canister and said one frame portion, the inward deflection having a deflection component directed opposite to the one direction.

17. The apparatus of claim 16 wherein said one frame portion comprises a tubular member.

18. The apparatus of claim 17 wherein said tubular member has an open D-shape in a cross-section taken in a direction transverse to the longitudinal extent of said tubular member.

19. The apparatus of claim 17 wherein each of said plurality of slots extends partially through said tubular member.

20. The apparatus of claim 16 wherein said plurality of slots define, in said one frame portion, a plurality of frame sections extending in a spaced apart longitudinally extending array.

21. The apparatus of claim 16 wherein said retainer frame has a central axis extending in a direction along the flow of inflation fluid into said air bag and wherein said plurality of slots are defined by planar surfaces extending in a direction substantially parallel to the axis of said retainer frame.

22. The apparatus in claim 21 wherein each of said slots has a width in the range of about 0.0001 inch to about 0.010 inch measured in a direction transverse to the direction of the flow of inflation fluid.

23. The apparatus of claim 16 wherein each of said plurality of slots is spaced apart from an adjacent slot a substantially equal spacing.

24. The apparatus of claim 23 wherein adjacent slots are spaced apart a distance in the range of about 0.2 inch to about 2 inches.

25. The apparatus of claim 16 wherein said retainer frame defines a parallelogram having a pair of base portions and a pair of leg portions, said base portions having a length greater than a length of said leg portions and said plurality of slots being formed in at least one of said base portions.

26. An apparatus comprising:

an inflatable air bag having a mounting portion defining an inlet opening;

an inflator providing a source of inflation fluid for inflating said air bag;

a reaction canister having a wall and supporting said inflator and said air bag; and a retainer frame to attach said mounting portion of said air bag to said reaction canister, said retainer frame comprising a portion fixed to said wall of said reaction canister and having a plurality of frame sections axially spaced apart a predetermined distance, each of said plurality of frame sections having a pair of axial end surfaces, adjacent frame sections engaging at adjacent end surfaces to resist outward deflection of said portion of said retainer frame in one direction during inflation of said air bag;

the predetermined distance between axial end surfaces of adjacent frame sections increasing to permit said portion of said retainer frame to deflect with a deflection component directed opposite the one direction when a force is applied from outside said reaction canister to said portion of said retainer frame.

27. The apparatus of claim 26 wherein each of said plurality of frame sections is spaced apart from an adjacent frame section a substantially equal spacing.

28. The apparatus of claim 26 wherein adjacent frame sections are spaced apart a distance in the range of about 0.0001 inch to about 0.010 inch.

29. The apparatus of claim 26 wherein said portion of said frame section is tubular.

* * * * *